United States Patent
Binzer

(10) Patent No.: US 9,140,787 B2
(45) Date of Patent: Sep. 22, 2015

(54) RADAR SENSOR FOR MOTOR VEHICLES, ESPECIALLY LCA SENSOR

(75) Inventor: Thomas Binzer, Ingersheim (DE)

(73) Assignee: ROBERT BOSCH GMBH, Stuttgart (GB)

( * ) Notice: Subject to any disclaimer, the term of this patent is extended or adjusted under 35 U.S.C. 154(b) by 378 days.

(21) Appl. No.: 13/821,061

(22) PCT Filed: Jul. 18, 2011

(86) PCT No.: PCT/EP2011/062195
§ 371 (c)(1),
(2), (4) Date: May 17, 2013

(87) PCT Pub. No.: WO2012/034736
PCT Pub. Date: Mar. 22, 2012

(65) Prior Publication Data
US 2013/0234881 A1    Sep. 12, 2013

(30) Foreign Application Priority Data

Sep. 14, 2010   (DE) .......................... 10 2010 040 692

(51) Int. Cl.
*G01S 13/93* (2006.01)
*H01Q 1/32* (2006.01)
(Continued)

(52) U.S. Cl.
CPC ............ *G01S 13/931* (2013.01); *H01Q 1/3233* (2013.01); *H01Q 3/30* (2013.01); *H01Q 9/0407* (2013.01); *H01Q 21/06* (2013.01); *H01Q 21/065* (2013.01); *H01Q 21/08* (2013.01); *G01S 2013/9332* (2013.01); *H01Q 1/32* (2013.01); *H01Q 3/26* (2013.01); *H01Q 3/28* (2013.01); *H01Q 3/34* (2013.01); *H01Q 3/36* (2013.01)

(58) Field of Classification Search
CPC ................... G01S 13/91–13/931; H01Q 1/32; H01Q 1/3233; H01Q 3/00; H01Q 3/26; H01Q 3/28; H01Q 3/30; H01Q 3/34; H01Q 3/36
USPC ............ 342/70–72, 146, 158, 360, 368, 371, 342/372; 343/711, 824, 825, 828, 844
See application file for complete search history.

(56) References Cited

U.S. PATENT DOCUMENTS 4,277,787 A * 7/1981 King ............................. 342/371
5,467,072 A * 11/1995 Michael ........................ 340/436
(Continued)

FOREIGN PATENT DOCUMENTS

DE       40 03 057       8/1991
DE       100 36 132      2/2002
(Continued)

OTHER PUBLICATIONS

International Search Report, dated Sep. 30, 2011, issued in corresponding PCT/EP2011/062195.

*Primary Examiner* — Peter Bythrow
(74) *Attorney, Agent, or Firm* — Kenyon & Kenyon LLP

(57) ABSTRACT

A radar sensor for motor vehicles has a transmitting antenna in the form of a planar array antenna having a plurality of juxtaposed antenna elements, and a supply network for supplying microwave power to the antenna elements, wherein the supply network is developed to supply the antenna elements with the microwave power having a phase shift increasing at constant increments from one end of the row to the other.

6 Claims, 3 Drawing Sheets

(51) Int. Cl.
*H01Q 3/26* (2006.01)
*H01Q 3/28* (2006.01)
*H01Q 3/30* (2006.01)
*H01Q 3/34* (2006.01)
*H01Q 3/36* (2006.01)
*H01Q 9/04* (2006.01)
*H01Q 21/06* (2006.01)
*H01Q 21/08* (2006.01)

(56) References Cited

U.S. PATENT DOCUMENTS

| | | | | |
|---|---|---|---|---|
| 5,712,640 | A * | 1/1998 | Andou et al. | 342/70 |
| 5,767,803 | A * | 6/1998 | Yamada | 342/69 |
| 5,933,109 | A * | 8/1999 | Tohya et al. | 342/175 |
| 6,094,166 | A * | 7/2000 | Martek et al. | 342/374 |
| 6,317,095 | B1 * | 11/2001 | Teshirogi et al. | 343/785 |
| 6,958,665 | B2 * | 10/2005 | Allison et al. | 333/164 |
| 7,504,988 | B2 * | 3/2009 | Tsuchihashi et al. | 342/70 |
| 7,728,772 | B2 * | 6/2010 | Mortazawi et al. | 342/375 |
| 8,031,116 | B1 * | 10/2011 | Lee et al. | 342/374 |
| 8,405,541 | B2 * | 3/2013 | Lee et al. | 342/118 |
| 8,749,441 | B2 * | 6/2014 | Fenn et al. | 343/793 |
| 2001/0015698 | A1 * | 8/2001 | Tokoro | 342/70 |
| 2007/0222662 | A1 * | 9/2007 | Toennesen et al. | 342/27 |
| 2008/0258964 | A1 * | 10/2008 | Schoeberl et al. | 342/189 |
| 2012/0050092 | A1 * | 3/2012 | Lee et al. | 342/146 |

FOREIGN PATENT DOCUMENTS

| | | |
|---|---|---|
| JP | H0595221 | 4/1993 |
| JP | 2007531872 | 11/2007 |
| WO | WO 2005/073753 | 8/2005 |

* cited by examiner

RADAR SENSOR FOR MOTOR VEHICLES, ESPECIALLY LCA SENSOR

CROSS REFERENCE TO RELATED APPLICATIONS

The present application is the national stage entry of International Patent Application No. PCT/EP2011/062195, filed on Jul. 18, 2011, which claims priority to Application No. DE 10 2010 040 692.9, filed in the Federal Republic of Germany on Sep. 14, 2010.

FIELD OF INVENTION

The present invention relates to a radar sensor for motor vehicles, having a transmitting antenna in the form of a planar array antenna having a plurality of juxtaposed antenna elements, and having a supply network for supplying microwave power to the antenna elements.

BACKGROUND INFORMATION

Antennas for radar sensors, which are provided for use in motor vehicles, are frequently designed as patch antennas on an HF substrate. This permits a cost-effective construction of the radar sensor. When array antennas are used, the desired directional characteristic of the radar sensor is able to be achieved in azimuth and/or in elevation, without requiring a radar lens. Separate antennas are frequently used for the radiation of the radar signal and for receiving the reflected signal. The desired directional characteristic of the transmitting antenna in azimuth is achievable by supplying the microwave power to the plurality of antenna elements juxtaposed on the substrate in the same phase. A radar lobe is then created by interference, whose main radiation direction is oriented at a right angle to the plane of the substrate, and which covers an azimuth angle range of about −45° to about +45°. On the receiving side also a plurality of juxtaposed antenna elements or patches are used, which belong, however, to different receiving channels, so that, based on the phase differences between the signals received by the different antenna elements, one is able to draw a conclusion on the azimuth angle of the object.

SUMMARY

The present invention relates particularly to a rear area radar sensor system for motor vehicles, for instance, in an LCA system, (lane change aid), which supports the driver during a lane change by warning of vehicles that are approaching from behind in one's own lane or the passing lane. In this case, the radar sensor system has to have a big range in the backward direction, so that even rapid vehicles are able to be detected in time, and, on the other hand, it has to be in a position to locate vehicles that are located at a small distance or nearly at the same level on the passing lane, and are consequently at a blind spot for the driver.

It is an object of the present invention to create a simply constructed and cost-effective radar sensor system, which permits fulfilling the above-mentioned requirements.

According to the present invention, this object is attained by a radar sensor of the type named at the outset, in which the supply network is developed to supply to the antenna elements the microwave power at a phase shift that increases at constant increments from one end of the row to the other.

By interference between the radar waves radiated by the various antenna elements, there then develops an asymmetrical antenna diagram, so that a large part of the microwave power is radiated at high intensity in a certain direction, and at the same time a smaller part of the microwave power is radiated to one side at a high azimuth angle. In this way, it is possible to detect the following traffic in one's own lane and in the passing lane, all the way into the blind spot, using a single radar sensor.

In one preferred exemplary embodiment, the supply network is developed so that the amplitude of the emitted microwaves also varies from antenna element to antenna element, for example, that it decreases from one end of the row of antenna elements to the opposite end. The power distribution of the emitted radar radiation is thereby equalized over the azimuth angle, so that position-finding gaps between the main lobe and the side lobes are closed to a great extent.

In the following, exemplary embodiments of the present invention are explained in detail with reference to the accompanying drawings.

DETAILED DESCRIPTION

Figure 1:
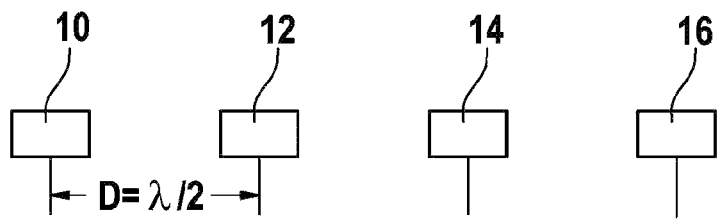
FIG. 1 is a schematic representation of a plurality of antenna elements situated in a horizontal line on a substrate that is not shown, with an indication of an example of the phase and amplitude configuration of the individual antenna elements.

FIG. 1 shows four antenna elements 10, 12, 14, 16, which are situated in a horizontal row at uniform distances on an HF substrate that is not shown. The antenna elements are shown here as single patches. Via a supply network that will be described in greater detail below, the antenna elements obtain a microwave signal, which is then supposed to be radiated as radar radiation. The average distance d of the antenna elements, in the example shown, amounts to one-half of a wavelength of the microwave radiation ($d=\lambda/2$).

The phase and amplitude configuration of antenna elements 10, 12, 14, 16 are also given in FIG. 1. With reference to antenna element 10 at the left end of the row (phase=0°), second antenna element 12 has a phase shift of 60°, third antenna element 14 has a phase shift of 120° and fourth antenna element 16 has a phase shift of 180°. The phase shift thus increases at the same increments (60°), and antenna elements 10 and 16 at the opposite ends of the row obtain signals that are 180 degrees out of phase.

The amplitude of the signals decreases linearly over the row of antenna elements from left to right. If the amplitude of the outermost left antenna element 10 is normalized to 1.0, the amplitude decreases to the right, from antenna element to antenna element. In the example shown, the amplitude decreases degressively to 0.7 for antenna element 12, 0.5 for antenna element 14, and finally 0.35 for antenna element 16.

Figure 2:
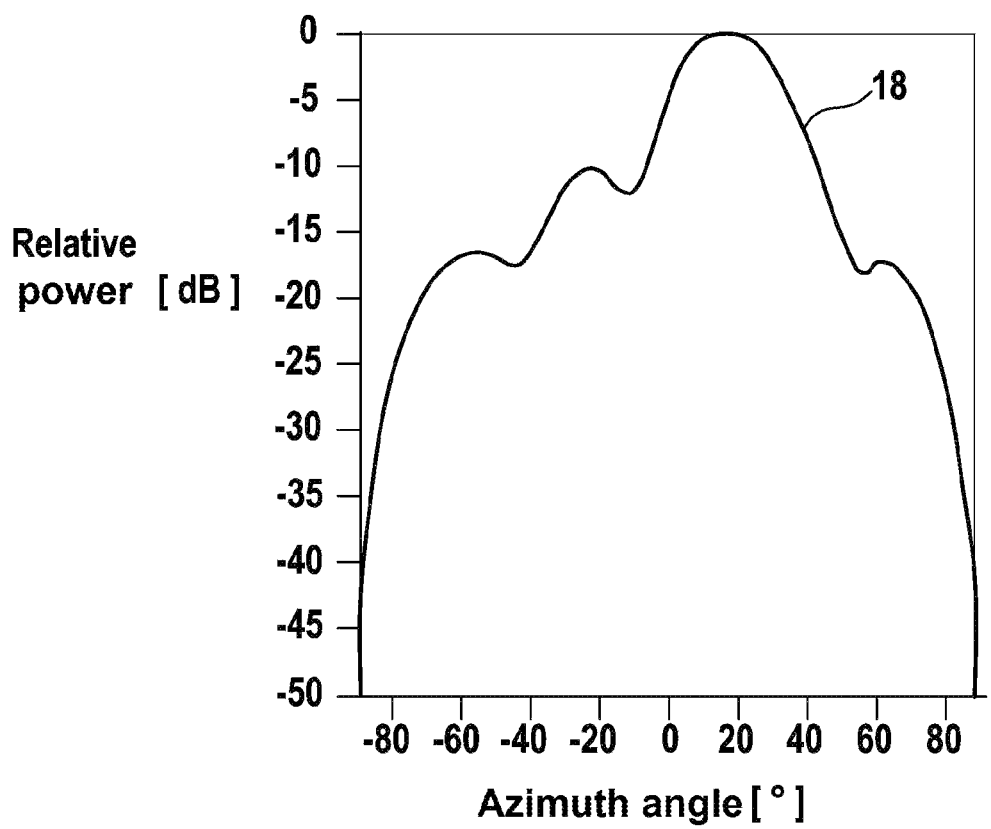
FIG. 2 is an antenna diagram for the antenna system and the phase and amplitude configuration according to FIG. 1.

FIG. 2 shows the antenna diagram that results from the phase and amplitude configuration shown in FIG. 1. Curve 18 in FIG. 2 gives the relative power of radar radiation emitted by antenna elements 10, 12, 14, 16 as a function of the azimuth angle. Because of interference between the radiation proportions emitted by the individual antenna elements, a clear maximum occurs at an azimuth angle of about 20°. For larger azimuth angles, the power drops off. By contrast, in the range of +20° to −90°, there are some side maxima, so that the power remains at a relatively high level until in the range of about −60°. Because of the nonuniform amplitude configuration according to FIG. 1, it is achieved that the minima in the antenna diagram are marked fairly weakly.

Figure 3:
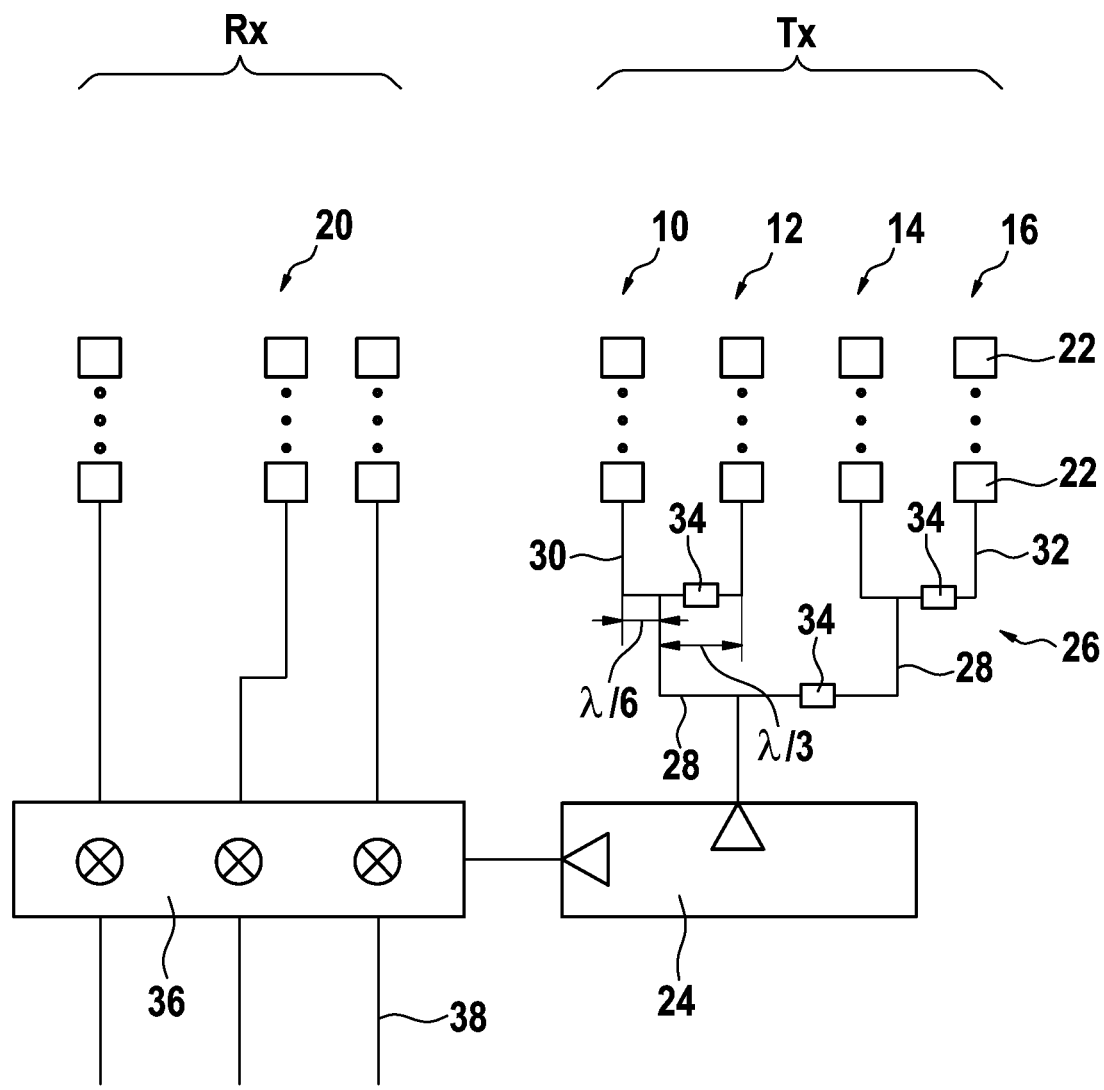
FIG. 3 is a block diagram of a radar sensor according to an exemplary embodiment of the present invention.

FIG. 3 shows a detailed circuit diagram of the essential components of a radar sensor having a transmitting antenna system according to FIG. 1.

The four antenna elements 10, 12, 14, 16 together form a transmitting antenna Tx. Three additional antenna elements 20 are situated at irregular lateral distances and together form a receiving antenna Rx. Antenna elements 10-16 and 20 are each made up of a column of patches 22, into which the microwave signals are connected in phase. Therefore, by interference, in elevation one obtains a directional characteristic having a marked main maximum at elevation angle 0° (at right angles to the substrate). This main maximum extends over an angular range of about −45° to about +45°. By contrast, side lobes are developed only weakly.

By contrast, in azimuth, the directional characteristic of transmitting antenna Tx corresponds to the antenna diagram according to FIG. 2, so that overall one obtains a radar beam that is vertically bundled but horizontally asymmetrically fanned out, without using a radar lens.

The microwave power for transmitting antenna Tx is generated by an oscillator 24 and is supplied to the individual antenna elements 10, 12, 14, 16 via a parallel supply network 26. This network branches from the output of oscillator 20 first into two branches 26, which in their length differ by $\lambda/3$, as a third of wavelength $\lambda$. Each branch 26 then branches again into two branches 30 and 32 having a difference in length of $\lambda/6$ each. In this way, the phase configuration shown in FIG. 1 is achieved. In order to set the amplitude configuration, in each case one of branches 28, 30 and 32 includes a so-called impedance transformer 34, using which the power passed on to the respective antenna elements are adjusted by the desired quantity.

The three antenna elements 20 of receiving antenna Rx are connected to a three-channel mixer 36, which mixes the signal received from each individual antenna element 20 with the transmitted signal supplied by oscillator 24. At outputs 38 of three-channel mixers 36, one obtains, as mixed products, the intermediate frequency signals, whose frequency corresponds to the frequency difference between the radiation emitted by transmitting antenna Tx and the radiation received at the same time from respective antenna element 20 of receiving antenna Rx. Since the frequency of oscillator 24 is ramp modulated, (FMCW radar: frequency-modulated continuous wave), the frequency of the intermediate frequency signals is a function both of the signal running time, and thus of the distance of the located object, and of the Doppler shift, and thus of the relative speed of the object. The phase differences between the intermediate frequency signals represent corresponding phase differences between the radar echos which are received from the various antenna elements 20. These phase differences are functions of the different length of the signal paths to juxtaposed antenna elements 20, and therefore give insight into the azimuth angle of the located object.

The evaluation of the intermediate frequency signals is known per se and will not be further discussed here.

Antenna elements 10, 12, 14, 16 of the transmitting antenna and antenna elements 20 of the receiving antenna, as well as supply network 26 may be formed on a common substrate in microstrip technology, which also accommodates three channel mixer 36 and oscillator 24, as well as possibly further components of the radar sensor.

Figure 4:
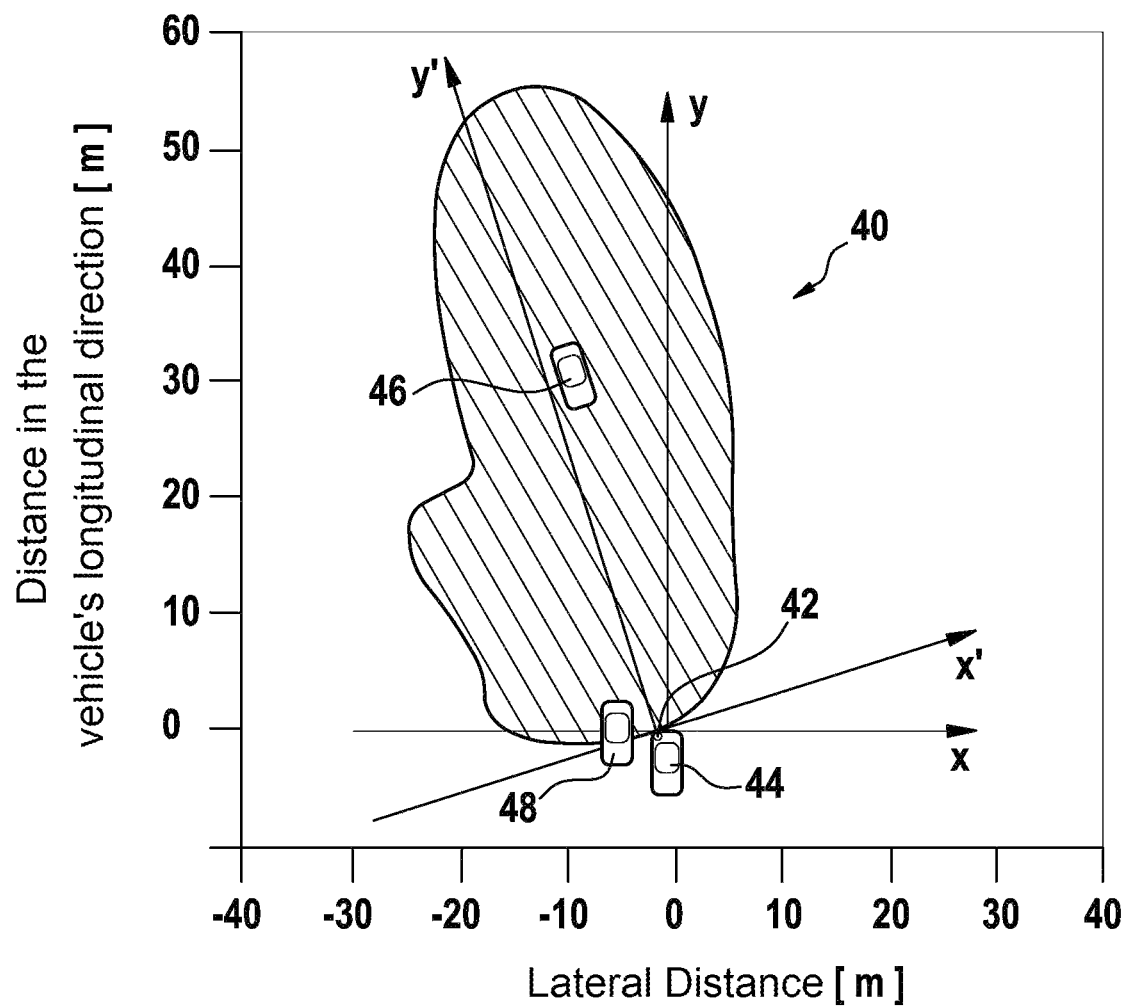
FIG. 4 is a locating diagram of an LCA radar sensor according to the present invention.

FIG. 4 shows a locating field 40 of a radar sensor 42 according to the present invention. Radar sensor 42 is installed in the rear of a motor vehicle 44 in such a way that azimuth angle 0° of the y' axis corresponds to an orthogonal coordinate system (x', y'), which is somewhat rotated compared to a vehicle coordinate system (x, y) (the y axis corresponds to the backwards travel direction of the vehicle).

In the example shown, radar sensor 42 is a rear area radar sensor, which is a part of an LCA system which warns the driver of the following traffic during an intentional lane change. In this example, the following traffic is made up of vehicles 46, 48, which are approaching on the passing lane (in this case, for left-hand driving). The radar sensor is oriented so that its far-reaching main lobe (by an azimuth angle of +20°) covers the passing lane and a large part of the own lane of vehicle 44. Thus, for example, vehicle 46 is able to be detected early. Vehicle 48 has just started to pass, and is located in a blind spot, as far as the driver of vehicle 44 is concerned. Because of the asymmetrical form of the locating field, however, even vehicle 48 is still able to be detected.

What is claimed is:

1. A radar sensor for motor vehicles, comprising:
 a transmitting antenna in a form of a planar array antenna having a plurality of juxtaposed antenna elements in a row; and
 a supply network for supplying microwave power to the antenna elements;
 wherein the supply network is configured to supply the antenna elements with the microwave power having a phase shift that increases at constant increments in a direction from one end of the row to an other end.

2. The radar sensor according to claim 1, wherein the antenna elements at opposite ends of the row are controlled 180° out of phase.

3. The radar sensor according to claim 2, wherein the transmitting antenna has four antenna elements, in which the phase shift between juxtaposed antenna elements amounts to 60°.

4. The radar sensor according to claim 1, wherein the supply network is furthermore configured to supply the antenna elements with the microwave power at different amplitudes.

5. The radar sensor according to claim 4, wherein the amplitude along the row of the antenna elements decreases in the direction in which the phase shift increases.

6. A driver assistance system for motor vehicles, comprising:
 a radar sensor system for locating objects which are located at small to large longitudinal distances behind one's own vehicle, including objects which are located almost at a same level in an adjacent lane;
 wherein the radar sensor system is formed by a single radar sensor, comprising:
  a transmitting antenna in a form of a planar array antenna having a plurality of juxtaposed antenna elements in a row; and
  a supply network for supplying microwave power to the antenna elements;
  wherein the supply network is configured to supply the antenna elements with the microwave power having a phase shift that increases at constant increments in a direction from one end of the row to an other end.

* * * * *